Patented Sept. 2, 1952

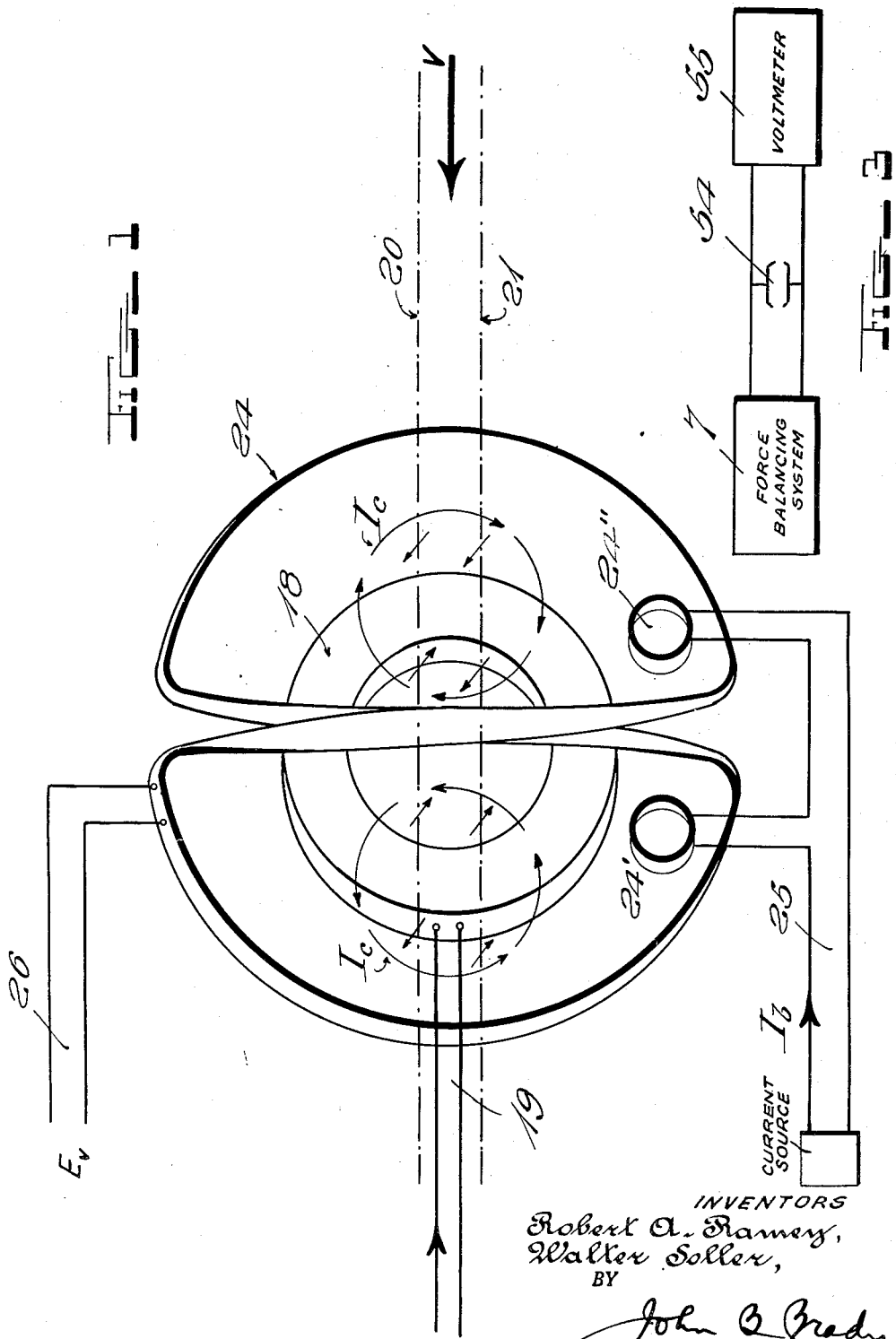

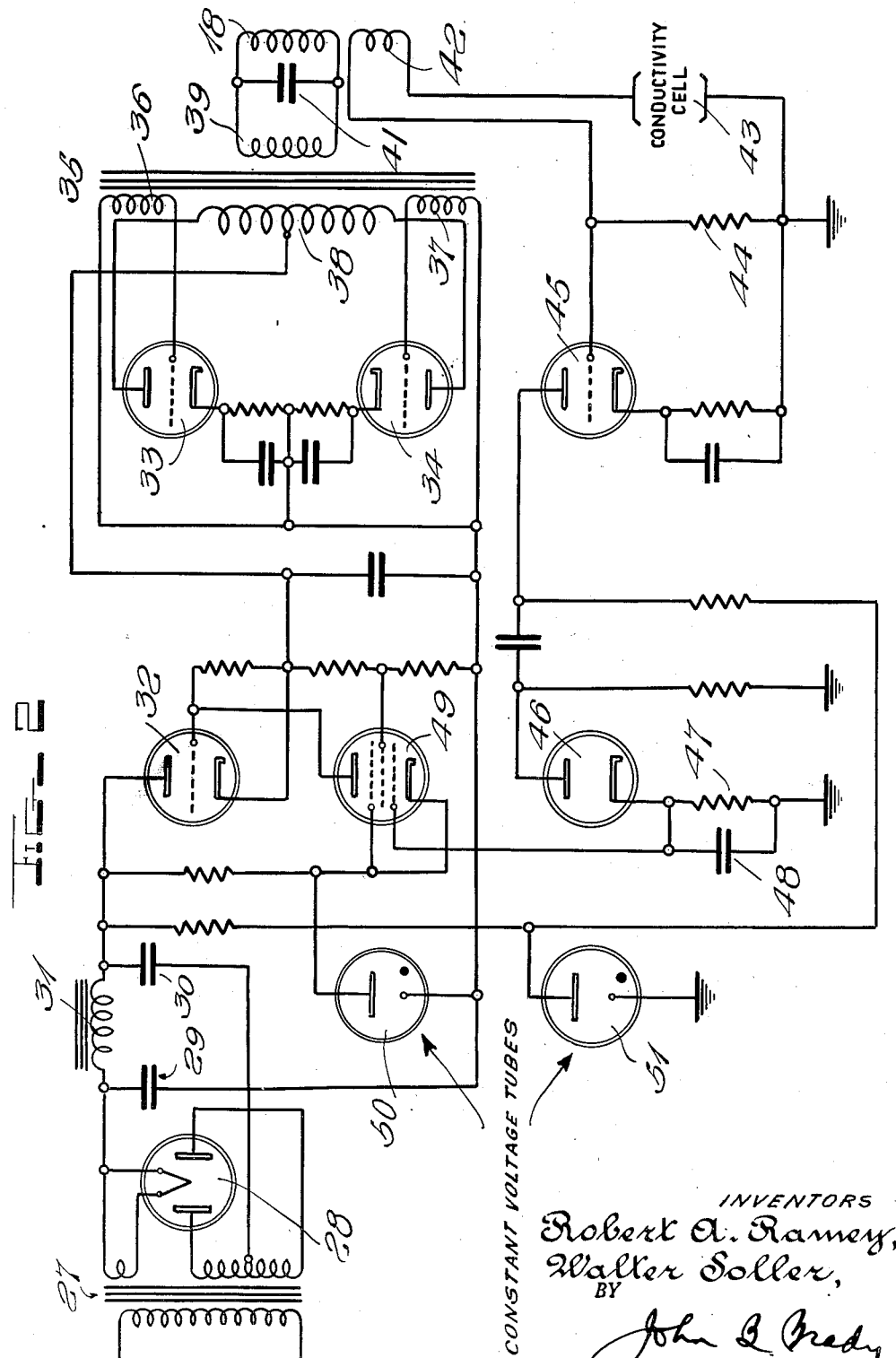

2,608,860

UNITED STATES PATENT OFFICE 2,608,860

APPARATUS FOR MEASURING VELOCITY

Robert A. Ramey and Walter Soller, Cincinnati, Ohio

Application June 9, 1947, Serial No. 753,490

6 Claims. (Cl. 73—194)

The object of this invention is to provide methods and apparatus for measuring the speed of electrically conducting systems by the reaction from circulating currents produced in these systems by a magnetic field emanating from the apparatus and the relative velocity of the systems and the apparatus.

Another object of this invention is to provide methods and apparatus for continuously measuring the speed of electrical conducting systems by means of detecting a magnetic field produced by the electric currents induced in said conducting systems, which in turn are produced by the relative velocity of the systems and another magnetic field emanating from the before-named apparatus.

A further object of this invention is to provide methods and apparatus for measuring speed of the apparatus through a conducting fluid by the force reaction on parts of the apparatus produced by the electric currents induced in the fluid by the magnetic field emanating from the apparatus and the velocity of this apparatus with respect to this fluid.

A still further object of this invention is to provide methods and apparatus for measuring speed of the apparatus through a conducting fluid by the voltage induced in detector coils in apparatus produced from a variable magnetic field coming from the circulating currents in the fluid produced by the variable magnetic field emanating from the apparatus and the velocity of the apparatus with respect to the fluid.

The method and apparatus may best be understood by a reference to the embodiment of the invention shown in the accompanying drawings, in which:

Fig. 1 illustrates a velocimeter embodying our invention in which the pickup coils are constructed in the arrangement of a figure eight for substantially balancing out all induced voltages existent in the velocimeter system when the apparatus is stationary; Fig. 2 diagrammatically and schematically shows one of the methods for compensating for varying resistivity of the moving conducting system, together with a method of supplying voltage and Fig. 3 schematically shows one of the methods we employ for correcting the velocimeter system for resistivity changes in the conducting fluid in which the velocimeter is used.

Referring to the drawings in detail, the magnetic velocimeter of our invention is intended for installation beneath the hull of a vessel, and enclosed in a non-magnetic streamlined housing depending from the vessel into the sea water as more fully explained in our copending application Serial Number 684,606, filed July 18, 1946, for Method and Apparatus for Force Balance. The force balancing system is represented at 7 in Fig. 3 and includes displaceable magnetic winding arranged in an intense magnetic field emanating from an associated field structure, the winding being connected with a circuit extending through required amplification to an indicating device.

Fig. 1 shows an A. C. magnetic velocimeter embodying our invention using pickup coils 24 constructed as a figure eight to determine the magnitude of the velocity magnetic field, that is, the field due to the current induced in the moving conducting system. Exciting coil 18 is supplied with alternating current $I_{ac}$ through wires 19 producing an exciting magnetic field whose directions are noted by the arrows along line 20. The electrical conducting system whose speed relative to the apparatus is to be measured passes the coil face continuously with its velocity V. Circulating electrical currents $I_c$, with the instantaneous directions and paths noted, are generated in the moving conducting system, producing a velocity magnetic field with instantaneous directions noted by the arrows along line 21 and proportional to the induced currents $I_c$, which are in turn directly proportional to the velocity V and the current $I_{ac}$ and inversely proportional to the resistivity of the moving conducting system. When the current $I_{ac}$ is made proportional to the resistivity of the moving conducting system, the magnitude of the velocity magnetic field is directly proportional to the velocity V. The magnitude of the velocity magnetic field is measured by the voltage $E_v$ it generates in the pickup coils 24. The winding in the form of a figure eight of these coils 24 provides a convenient method for balancing out the voltages which are generated in the pickup coils 24 by the exciting magnetic field and by the directly induced currents in the conducting system which is radially symmetrical, and for detecting the velocity magnetic field, that is, bilaterally symmetric with respect to magnitude but opposite in direction. The advantage of the figure of eight winding 24 will be appreciated by considering the ease and efficiency with which the voltages may be balanced turn by turn where voltages of only small magnitude exist. The coils forming the figure of eight circuit are not arranged to react upon themselves coil by coil where substantial magnitude of voltage may exist but the balancing is performed under conditions where voltages of very small magnitude are to be balanced turn by turn in the figure of eight winding.

Small voltages require only a reasonably small amount of insulation in the coil system of our invention as compared to insulation problems involved when balancing the fields of opposing coils of many turns.

The balancing problem when considered coil by coil might reasonably involve the balancing of voltages of the order of magnitude of 1000 volts so that the insulation problem is both expensive and difficult. The space problem is also a major point of consideration as it is desirable to have the energizing winding 18 as close to the conducting fluid as possible. This is difficult where the winding 24 would have to be insulated against breakdown under conditions of very high voltages. However, with the figure of eight winding where the insulation is effected turn by turn the insulation required is only that sufficient to insulate terminal voltages of the order of the voltage of one turn which are less than a volt.

The figure of eight winding also has the advantage of reducing circulating currents in the winding circuit arising from interwinding capacitance. These circulating currents may be of substantial magnitude in the conventional coil but in the figure of eight winding used in our invention this circulating current is reduced to a comparatively small magnitude. These circulating currents are undesirable as they necessarily interfere with stability of the measuring circuit. The figure of eight winding serves to maintain these circulating currents at a value far below the minimum that can be achieved by balancing these voltages coil by coil instead of turn by turn as is effected in our invention. We selected the figure of eight arrangement for it substantially balances out all induced voltages when the apparatus is stationary. Coils 24' and 24'' are provided to accurately balance out those voltages by adjusting current $I_b$ in circuit 25. Measurement by a voltmeter of the voltage $E_v$ from the pickup coils 24 at circuit 26 gives a reading which is calibrated in units of speed.

In Fig. 2 one of the methods for compensating for varying resistivity of the moving conducting system is shown together with a method of supplying voltage of the operating frequency to the exciting coil. Electric power is supplied to the system through transformer 27 and the current in the secondary system is rectified in tube 28 and filtered by condensers 29 and 30 and choke 31 providing a source of direct voltage. This voltage is controlled by the voltage on control tube 32 and is applied to oscillator tubes 33 and 34 through transformer 35 having tickler coils 36 and 37 magnetically coupled with primary coil 38 and secondary coil 39 which connects to the exciting coil 18 of the velocimeter. A resonating condenser 41 is connected across exciting coil 18.

When the D. C. voltage is applied to the oscillator tubes 33 and 34 they will supply A. C. current to the velocimeter coil 18. The amplitude of this A. C. current is proportional to the applied D. C. voltage. Magnetically coupled to the velocimeter exciting coil 18 is coil 42 whose voltage depends directly upon the current in the exciting coil 18. The output voltage of coil 42 is applied to the conductivity cell 43 and the resistor 44 in series. Since the conductivity resistance of cell 43 is made large relative to the resistance 44 the voltage across the resistance 44 is proportional to the exciting current of the electromagnetic velocimeter divided by the resistivity of the moving conducting system. The voltage across resistor 44 is amplified by tube 45 and rectified by tube 46 providing a D. C. voltage across resistor 47 and the shunting condenser 48 which voltage is applied to regulator tube 49 which provides the grid voltage for control tube 32. Constant voltage tube 50 is used as a reference voltage for control tube 32 and constant voltage tube 51 provides plate voltage for amplifier tube 45.

The function of this system is to provide exciting current to the exciting coil 18 which is directly proportional to the resistivity of the associated moving conducting system. By holding the voltage across resistance 44 constant the ratio of exciting current to resistivity is held constant and so they are always directly proportional.

To demonstrate the circuit operation assume the conductivity has decreased. The voltage across resistance 44 increases and is amplified in tube 45 and rectified and applied to the regulator tube 49 increasing its grid voltage and dropping its plate voltage and so dropping the grid voltage of the control tube 32 and so decreasing the D. C. voltage applied to the oscillator and also the current supplied to the exciting coil 18 dropping the voltage across resistance 44 to its original value.

Since the output of the pickup coils 24 (shown in Fig. 1) is directly proportional to the velocity V and the current $I_{ac}$ and inversely proportional to the resistivity, then, since $I_{ac}$ has been made to vary directly with the resistivity (constant ratio), the output voltage of the pickup coils 24 is proportional only to the velocity V.

In Fig. 3 we have shown a method for correcting for resistivity changes in a conducting field. The output current of the force balancing system 7 is sent through a conductivity cell 54 and the voltage across this cell is read on voltmeter 55 which automatically provides a compensated reading. Since the output current of the force balancing system is proportional to the velocity divided by the resistivity and the output voltage of the conductivity cell 54 is proportional to the resistivity of the conductor times the output current of the force balancing current, a simple multiplication shows that the resistivity effects are immediately cancelled and the voltmeter reading depends entirely upon the velocity. An A. C. type of force balancing system is used when this type of conductivity measurement is used.

The general problem to which our invention has been addressed is to measure the speed of the electrically conducting system by the interaction on measurement apparatus of electrical currents generated in the moving conducting system by the conducting system's velocity relative to a magnetic field emanating from the measurement apparatus. In the example illustrated, this interaction has been measured by the electromotive force generated in a pickup coil (Fig. 1).

The specific size or shape of exciting coils, pickup coils, and ferromagnetic cores is not critical and we do not intend to limit the generality of the solution of this problem to the particular apparatus and circuits illustrated. For example the pickup coils 24 may be wound in the shape shown or as/or more symmetrically located coils coacting with the exciting field balanced either by bucking the coil output voltages due to the exciting field, or by locating the pickup coils over the exciting coils in such a position as to make the vector sum of the exciting flux through the coil zero. The pickup coils may be resonant or not.

Methods of balancing out the effects in the measurement apparatus are varied due to the exciting magnetic field, such as by introducing the balancing coil, as in Fig. 1.

Correction for resistivity changes, as illustrated herein, is not intended to limit the generality of this application since it is recognized that any method of measuring resistivity and properly correcting the final reading by use of the obtained data, either continuously or intermittently may be used in making velocity measurements whose accuracy depends upon the method and apparatus used. The two methods shown in Fig. 2 and Fig. 3 are of the continuous types.

While we have described our invention in certain preferred embodiments we realize that modifications may be made and we desire that it be clearly understood that no limitations upon our invention are intended other than may be imposed by the scope of the appended claims.

What we claim as new and desire to secure by Letters Patent of the United States is as follows:

1. Means for electrically measuring the velocity of a body moving through an electrically conducting fluid comprising a pair of inductively related electrical windings disposed below the surface of the electrically conducting fluid through which said body moves, means for exciting one of said windings for establishing a magnetic field of force in the electrically conducting fluid and producing thereby a reactionary magnetic field operative to energize the other of said windings, a measuring system for detecting the reactionary effect upon said last mentioned winding, an observing device connected with said measuring system, said last-named winding being arranged substantially in the form of a figure eight with transverse portions thereof extending substantially diametrically of said first mentioned winding, a coil electrically coupled with each transverse portion of said figure of eight winding, a series circuit including said coils, and a source of current for compensating for voltage unbalance in said figure of eight winding.

2. Means for electrically measuring the velocity of a body moving through an electrically conducting fluid comprising a pair of inductively related electrical windings disposed below the surface of the electrically conducting fluid through which said body moves, means for exciting one of said windings for establishing a magnetic field of force in the electrically conducting fluid and producing thereby a reactionary magnetic field operative to energize the other of said windings, a measuring system for detecting the reactionary effect upon said last mentioned winding, an observing device connected with said measuring system, said last-named winding being arranged substantially in the form of a figure eight with transverse portions thereof extending substantially diametrically of said first mentioned winding, a pair of compensating coils electromagnetically coupled with each lobe of said figure of eight winding and electrically connected in series and a current source connected in said series circuit for electrically balancing said winding.

3. Means for electrically measuring the velocity of a body moving through an electrically conducting fluid comprising a pair of inductively related electrical windings disposed below the surface of the electrically conducting fluid through which said body moves, means for exciting one of said windings for establishing a magnetic field of force in the electrically conducting fluid and producing thereby a reactionary magnetic field operative to energize the other of said windings, said last mentioned winding having the form of a figure of eight in a plane substantially parallel to the plane of the other winding, a measuring system for detecting the reactionary effect upon said last mentioned winding, an observing device connected with said measuring system, and means coupled with each lobe of said figure of eight winding and electrically connected in series for compensating for voltage unbalance therein.

4. Means for electrically measuring the velocity of a body moving through an electrically conducting fluid comprising a pair of inductively related electrical windings disposed below the surface of the electrically conducting fluid through which said body moves, means for exciting one of said windings for establishing a magnetic field of force in the electrically conducting fluid and producing thereby a reactionary magnetic field operative to energize the other of said windings, said last mentioned winding having the form of a figure of eight in a plane substantially parallel to the plane of the other winding, a measuring system for detecting the reactionary effect upon said last mentioned winding, an observing device connected with said measuring system, and electromagnetic means magnetically coupled with each of the lobes of said figure of eight winding for compensating for voltage unbalance therein.

5. Means for electrically measuring the velocity of a body moving through an electrically conducting fluid comprising a pair of inductively related electrical windings disposed below the surface of the electrically conducting fluid through which said body moves, means for exciting one of said windings for establishing a magnetic field of force in the electrically conducting fluid and producing thereby a reactionary magnetic field operative to energize the other of said windings, said last mentioned winding having the form of a figure of eight in a plane substantially parallel to the plane of the other winding, a measuring system for detecting the reactionary effect upon said last mentioned winding, an observing device connected with said measuring system, and means disposed coplanar with the plane of each lobe of the figure of eight winding and individually coupled with the respective lobes for compensating for voltage unbalance therein.

6. Means for electrically measuring the velocity of a body moving through an electrically conducting fluid comprising a pair of inductively related electrical windings disposed below the surface of the electrically conducting fluid through which said body moves, means for exciting one of said windings for establishing a magnetic field of force in the electrically conducting fluid and producing thereby a reactionary magnetic field operative to energize the other of said windings, said last mentioned winding having the form of a figure of eight in a plane substantially parallel to the plane of the other winding, a measuring system for detecting the reactionary effect upon said last mentioned winding, an observing device connected with said measuring system, and a coil individual to each lobe of said figure of eight winding, said coils being electrically connected in series and being disposed coplanar with the plane of said figure of eight winding and being electrically excited for compensating for voltage unbalance therein.

ROBERT A. RAMEY.
WALTER SOLLER.

REFERENCES CITED

The following references are of record in the file of this patent:

UNITED STATES PATENTS

| Number | Name | Date |
|---|---|---|
| 1,249,530 | Smith et al. | Dec. 11, 1917 |
| 2,149,847 | Kolin | Mar. 7, 1939 |
| 2,435,043 | Lehde et al. | Jan. 27, 1948 |